United States Patent Office 2,837,495
Patented June 3, 1958

2,837,495
RUBBER COMPOSITION CONTAINING ALUMINA-SILICA PIGMENT

Edward M. Allen, Doylestown, Ohio, assignor to Columbia-Southern Chemical Corporation, Allegheny County, Pa., a corporation of Delaware No Drawing. Application November 26, 1954
Serial No. 471,533

8 Claims. (Cl. 260—41.5)

This invention relates to novel siliceous pigments and to novel rubber-siliceous pigment compositions having superior properties.

According to this invention, a novel nontoxic pigment having the composition $M_2O_3(SiO_2)_x$, where $x$ is 6.5 to 500 and M is aluminum and/or iron and having other properties as hereinafter set forth, is provided. This pigment is a valuable rubber reinforcing pigment.

It has been discovered that an improved rubber can be prepared by compounding a vulcanizable rubber, especially a synthetic rubber prepared by polymerization of acrylonitrile with a diolefin such as butadiene, with a finely divided, amorphous alumina-silica or iron-silica or iron-alumina-silica pigment containing about 6 to 300 moles of $SiO_2$ per mole of $Al_2O_3$ and $Fe_2O_3$, an average ultimate particle size below 0.1 micron, preferably in the range of 0.01 to 0.05 micron, and containing at least 60 percent by weight of $SiO_2$ on the anhydrous basis (that is, on a basis excluding bound and free water). The siliceous material herein contemplated also may contain bound water in the proportion of about one mole of bound water per 3 to 30 moles of $SiO_2$. Normally, the pigment also will contain about 2 to 10 percent of free water, based upon the total weight of the pigment, and has a surface area of 60 to 200 square meters per gram. While pigments having higher surface areas, for example up to 300 or 400 square meters per gram, also may be used, difficulty frequently is encountered in recovering pigments of this character in an unagglomerated form in the desired particle size range.

The surface area of the pigment may be measured by the Brunauer-Emmett-Teller method which is described in the Journal of the American Chemical Society, volume 60, page 309 (1938).

The presence of the alumina appears to materially improve the dispersibility of the silica in rubber compositions. That is, it minimizes the tendency toward the existence of small white specks or agglomerates of silica in the rubber composition after vulcanization. Materially improved properties are obtained, particularly in acrylonitrile-butadiene copolymers such as those obtained by copolymerization of 60 to 90 parts by weight of butadiene with 40 to 10 parts by weight of acrylonitrile. These improvements appear to be due to the presence of the aluminum. The presence of iron and/or alumina also appears to be of value in ensuring nontoxicity of the siliceous pigment.

In certain cases where the aluminum is not closely tied in with the silica and therefore is readily removable, the presence of the alumina may have an adverse effect on the aging properties of certain rubber, such as GR-S. On the other hand, where the alumina is more closely tied to the silica and is not as clearly present in a readily ionizable form such as is the case with more complex silicates, this adverse aging does not appear to develop. In any event, however, the adverse effect upon aging is not serious in most cases.

The siliceous composition herein contemplated may also contain various other metallic components. For example, alkaline earth metals, such as calcium, may be present in small or relatively large amounts. Moreover, the ratio of the sum of the ratio of the moles of other metal oxides to moles of $Al_2O_3$ should not exceed about 5 moles of other metal oxides per mole of $Al_2O_3$. By far the best reinforcement is achieved using pigments containing in excess of about 80 percent $SiO_2$ by weight, including bound but not free water. In such a case, the ratio of moles of $SiO_2$ to the sum of the moles of all metal oxides normally exceeds 10.

The term "free water," as used herein, is intended to denote the water which may be removed from the siliceous pigment by heating the pigment at a temperature of 105° C. for a period of 24 hours in a laboratory oven. The term "bound water," as used herein, is intended to mean the amount of water which is driven off from the silica pigment by heating the pigment at ignition temperature, for example, 1000 to 1200° C. until no further water can be removed, minus the amount of free water in the pigment.

The presence of free water in a pigment offers certain advantages since it tends to accelerate the tendency of the pigment to cure. Thus, pigments from which free water has been removed frequently cure relatively slowly unless other additives, such as ethylene glycol or the like, are introduced into the composition.

While the improvement is most noticeable when the above described silica compositions are used in connection with acrylonitrile-butadiene rubber-like copolymers, these materials may be used to reinforce various rubber compositions, including natural rubber and synthetic rubber compositions such as those which are formed by polymerization of a diolefin and by copolymerization of a diolefin with a mono-olefin, usually in the proportion of 40 to 99 parts by weight of the diolefin per 60 to 1 part of the mono-olefin. Typical compositions of such character include butadiene-1,3-styrene copolymers conventionally known as GR-S rubber, butadiene-acrylonitrile copolymers, butadiene-isobutylene copolymers (butyl rubber), and like synthetic elastomers which are derived from the polymerization of butadiene-1,3 or 2-chlorobutadiene, isoprene or the like, alone or with other polymerizable materials including styrene, methyl methacrylate, methyl chloracrylate, acrylonitrile, vinyl chloride, and their equivalents.

Approximately 5 to 100 parts by weight of the alumina-silica pigment is incorporated per 100 parts by weight of the rubber. Best results are obtained when 20 to 80 parts by weight of the alumina-silica composition herein contemplated is used per 100 parts of rubber. The rubber composition may contain other conventional components such as accelerators, modifying agents, other fillers, notably finely divided carbon black, and the like.

The alumina-silica or iron-silica pigments herein contemplated may be prepared by various methods. According to one suitable method, a finely divided calcium-aluminum silicate or calcium-iron silicate, preferably having a particle size below about 0.05 micron, usually in the range of 0.02 to 0.05 micron, may be reacted with an acid which forms a water soluble salt of calcium and alumina. A typical acid of this character is hydrochloric acid.

The calcium-aluminum silicate which is thus reacted is treated with an amount of acid sufficient to remove a major portion of the calcium, iron and/or aluminum, care being taken to avoid removal of all of the metals, including iron and aluminum. This may be effected when little or no alkali metal silicate is present by controlling the degree of acidification to ensure production of a slurry having a pH above about 7, usually in the range of 7 to 9. Best results are obtained in this case by a careful control of the method by which the calcium-aluminum silicate and calcium-iron silicate is prepared prior to treatment with the hydrochloric or like acid.

Thus, a convenient method of preparing the calcium silicate herein contemplated involves the reaction of aqueous sodium silicate containing small amounts of alumina as sodium aluminate or in other form and/or iron as sodium ferrate or the like with aqueous calcium chloride solution containing sodium chloride, preferably in the range of at least 0.1 pound, and usually in the range of 0.2 to 0.5 pound of sodium chloride per pound of calcium chloride, the calcium chloride being in stoichiometric excess of the alkali metal silicate or at least nearly so.

The concentrations of the calcium chloride solution and the alkali metal silicate solution also have a bearing upon the final product. Thus, using a solution in which the sodium chloride content was 0.3 to 0.4 pound per pound of calcium chloride, pigments of inferior quality were obtained when the calcium chloride concentration was 5 or 10 grams per liter. Best pigments are obtained in such a case when the calcium chloride solution contains at least 20 grams per liter, usually in the range of 50 to 150 grams per liter, and using sodium silicate solution containing in excess of 20 grams of $SiO_2$ per liter, usually in the range of 50 to 150 grams per liter of $SiO_2$.

The proportion of calcium chloride solution to sodium silicate normally is sufficient to react with all or at least most of the sodium silicate. In general, the amount of calcium chloride is in stoichiometric excess. However, small excesses of sodium silicate are not objectionable. Thus, it is possible to use sodium silicate 10 to 25 percent in excess of the calcium chloride although best results are obtained when the calcium chloride is at least in stoichiometric amount. Excesses of sodium silicate as high as 100 percent over stoichiometric usually give unsatisfactory products having too high a surface area when the resulting mixture is treated with acid in order to remove a portion of the calcium.

The precipitation of calcium-aluminum silicate or other alkaline earth metal-aluminum silicate or alkaline earth-iron silicate in finely divided state, such as is herein required, may be accomplished with best results by mixing a stream of the aqueous sodium silicate-sodium aluminate or sodium silicate solution containing dissolved iron with the calcium chloride solution under conditions which subject the mixture to a high degree of turbulence and almost instantaneous mixing. The amount of reactants in the respective streams is proportioned so as to obtain calcium silicate in the desired concentration and to establish an excess of calcium chloride over the stoichiometric quantity required to react with the silicate. One effective way to produce the required turbulence is to introduce the two streams closely together into a central area of a centrifugal pump. In this case, the agitation of the mixture is effected as the introduced streams of the reactants are thrown radially outward by the pump rotor. In most cases, it is found desirable to limit the feed of the calcium chloride solution and alkaline metal silicate solutions to the pump in an amount below the capacity of the pump. For example, if the pump is capable of discharging 100 gallons per minute with unlimited flow of liquid to the pump, the amount of reacting solution supplied to the pump is held at least 10 percent below, and usually 35 percent or more below this amount. This appears to afford a greater degree of agitation of the reacting solutions and to ensure production of calcium silicate having the desired fineness.

To ensure production of the calcium-aluminum silicate or calcium-iron silicate in a highly finely divided state, alkali metal silicate having the composition $$Na_2O(SiO_2)_x$$

where $x$ is a number not less than 2 nor more than 4, is preferably used. This results in the production of a calcium silicate wherein the ration of calcium to $SiO_2$ is substantially $x$ as defined above. However, other calcium silicates, wherein $x$ is higher, may be used in certain cases.

Following preparation of the calcium silicate slurry, the calcium silicate is purified by washing out the dissolved salts and then is treated with acid, as described above. Hydrochloric acid is an especially convenient acid to use for this purpose. However, it will be understood that other acids which form water soluble salts of calcium can be used. Typical acids of such character include acetic acid, nitric acid, and the like.

The following is a typical example of an alumina-silica composition which can be prepared by this method:

EXAMPLE I

An aqueous solution of sodium silicate was prepared by diluting 5.88 liters of sodium silicate containing 298 grams per liter of $SiO_2$ as sodium silicate having the composition $Na_2O(SiO_2)_{3.36}$ with sufficient water to produce 20.7 gallons of solution. The sodium silicate used also contained 1 to 2 percent by weight of $Al_2O_3$ and $Fe_2O_3$. A further solution was made by dissolving 1220 grams of calcium chloride and 320 grams of sodium chloride in 16.0 gallons of water. Streams of these aqueous solutions were fed directly into the central area of a centrifugal pump, proportioning the rates of flow so that calcium chloride remained in excess over the stoichiometric quantity required for reaction with the sodium silicate at all times. After mixing of the two solutions was complete, 475 grams of ammonium chloride was added to the resulting calcium silicate slurry and the slurry was thereafter boiled for about 4 hours, at which time the odor of ammonia was very faint. Thereafter, the slurry was washed and filtered, and was dried at a temperature of about 120° C. A white friable product having the following composition was produced:

|  | Percent by weight |
|---|---|
| Ignition loss | 13.67 |
| $SiO_2$ | 77.84 |
| $Fe_2O_3$ and $Al_2O_3$ | 1.30 |
| CaO | 5.88 |
| MgO | 1.36 |

According to a further embodiment of the invention, finely divided calcium silicate of the type described above may be reacted with aluminum salts which form either a water soluble or water insoluble calcium salt. Where the salt is water soluble, the calcium is extracted to an appreciable degree.

The amount of aluminum chloride or like salt which may be used for this purpose normally is sufficient to react with about 30 to about 50 percent by weight of the calcium silicate. The reaction between the aluminum salt and the calcium silicate proceeds substantially according to the following equation:

$$2Al_n(An)_3 + 3nCaO(SiO_2)_x \rightarrow nAl_2O_3(SiO_2)_{3x} + 3Ca_n(An)_2$$

where An is an anion of the aluminum salt (Cl, $SO_4$, etc.), $n$ is the valence of the anion An, and $x$ denotes the mole ratio of CaO to $SiO_2$ in the calcium silicate treated and is between 2 and 5.

From the above equation it will be apparent that when 3 moles of the calcium silicate $CaO(SiO_2)_{3.36}$ is reacted with one mole of aluminum chloride, the resulting product is an aluminum silicate having the approximate composition $Al_2O_3(SiO_2)_{10.08}$. Such a silica-alumina material is very useful and may be used to reinforce rubber compositions in accordance with this invention. It will be understood that calcium-alumina silicate of different ratios may be produced by varying the amount of aluminum chloride used. Furthermore, a hydrochloric acid solution of aluminum chloride may be used to react with the calcium silicate and, in such a case, aluminum silicates of even higher silica content can be produced.

Calcium aluminum silicates may be prepared by reacting calcium silicate with less than the stoichiometric amount of aluminum salt.

Instead of aluminum chloride or aluminum nitrate, aluminum sulphate may be reacted with calcium silicate to produce the silicate herein contemplated. In such a case, calcium sulphate is formed. Since calcium sulphate has a rather low water solubility, the product frequently contains some portion of this material. However, all or a portion of the calcium sulphate may be washed out of the alumina-silica pigment.

EXAMPLE II

A water slurry containing 10 pounds of finely divided calcium silicate having an average ultimate particle size of about 0.05 micron, as determined by the electron microscope, and having the composition $CaO \cdot (SiO_2)_{3.36}$, was thoroughly mixed with an aqueous solution containing 4.44 pounds of aluminum sulphate in an agitated tank. After thorough mixing, the slurry was filtered and dried in a tray-type dryer at a temperature of 100–125° C. The resulting silicate product is a very fine white powder. This product has the composition approximately corresponding to the formula $Al_2O_3(SiO_2)_{10.08}$, and usually contains 0.1 to 0.4 mole of chemically combined CaO per mole of $Al_2O_3$.

EXAMPLE III

Five gallons of calcium silicate slurry prepared as in Example I was washed to reduce the NaCl content below 0.2 grams per liter and aluminum sulphate solution in amount sufficient to react with one-third of the CaO in the calcium silicate was added. The product was filtered and dried.

The resulting product which had a surface area of 158 square meters per gram, when tested in GR–S rubber, gave a product having a tensile strength markedly superior to that obtained when an equal weight of calcium silicate was used.

The composition containing alumina thus obtained dispersed in GR–S rubber better than the calcium silicate from which it was made.

EXAMPLE IV

An aqueous slurry of finely divided calcium silicate was prepared by introducing a stream of a solution of aqueous sodium silicate containing 10 grams of $SiO_2$ as $$Na_2O \cdot (SiO_2)_{3.36}$$

per liter of solution and a stream of aqueous calcium chloride containing 10 grams of $CaCl_2$ per liter into a centrifugal pump, as described above. Sufficient calcium chloride was used to ensure an excess of at least 10 percent of calcium chloride over the theoretical amount required to react with the sodium silicate. The calcium silicate thus produced had an average ultimate particle size of about 0.03 to 0.05 micron.

This material was washed and thickened and then mixed with an aqueous solution of aluminum chloride in amount sufficient to provide 20 percent excess aluminum chloride over the stoichiometric amount required to react with all of the CaO in the calcium silicate. The mixture was held at a temperature of 160° F. for 2 hours. The excess chloride was then washed out and the remaining material was filtered on Buchner funnels, dried at 220° F., and pulverized. The chemical analysis of the aluminum silicate thus prepared was as follows:

| | Percent |
|---|---|
| $SiO_2$ | 69.5 |
| $Al_2O_3$ | 13.9 |
| $Fe_2O_3$ | 0.88 |
| CaO | 2.1 |
| NaCl | 0.2 |
| Ignition losses | 13.0 |
| $H_2O$ | 3.6 |

This pulverized material was compounded in GR–S rubber, using standard compounding procedures, according to the following recipe:

| | Parts by weight |
|---|---|
| GR–S | 100.0 |
| Zinc oxide | 5.0 |
| Sulphur | 4.0 |
| Santocure | 1.75 |
| Picco 100 | 10.0 |
| Agerite powder | 1.0 |
| Aluminum silicate | 82.8 |

The resulting compounds were milled into two separate sheets and cured for varying lengths of time at a temperature of 280° F. The rubber compound obtained by using the aluminum silicate pigment had tensile and tear strengths higher than those obtained using calcium silicate as a reinforcing pigment.

The compositions listed in the above formulations by trade name have chemical compositions as follows:

"Santocure"—N-cyclohexyl-2-benzothiazol-sulfonamide.
"Picco 100"—para cumarone-indene resin having a melting point of about 110 to 127° C.
"Agerite Powder"—phenyl beta-naphthylamine.

EXAMPLE V

A stream of an aqueous solution of sodium silicate containing 100 grams of $SiO_2$ per liter as $Na_2O(SiO_2)_{3.36}$ and a stream of calcium choloride containing 100 grams per liter of solution were introduced into a centrifugal pump impeller, as described above, while proportioning the calcium chloride so that it remained at least 10 percent in excess. The slurry was washed to remove dissolved chloride. Samples of this slurry were reacted with aluminum chloride solution in amounts equal to 10 percent, 30 percent, 50 percent, 75 percent, and 100 percent of the theoretical amount required to react with all of the CaO in the calcium silicate. In these tests, the aluminum chloride was mixed in solution with the slurry and the mixture was allowed to stand for 4 hours at 160° F. The materials thus obtained had the following compositions:

*Table I*

| Sample No. | Per cent by weight | | | | Amount of $AlCl_3$ added, Percent of Stoichiometric |
|---|---|---|---|---|---|
| | Ignition Loss (bound and free water) | $SiO_2$ | $Al_2O_3$ | CaO | |
| | | | | | Percent |
| 1 | 20.93 | 58.92 | 0.40 | 18.03 | None |
| 2 | 25.75 | 51.55 | 2.99 | 17.72 | 10 |
| 3 | 23.38 | 57.43 | 4.91 | 13.29 | 30 |
| 4 | 22.34 | 60.03 | 5.63 | 9.83 | 50 |
| 5 | 22.26 | 60.17 | 7.80 | 9.08 | 75 |
| 6 | 19.38 | 64.01 | 13.96 | 2.44 | 100 |

A pigment having improved dispersion characteristics in rubber may be produced by simultaneously reacting together:

(1) A water soluble alkaline earth metal salt such as calcium chloride,
(2) An alkali metal silicate, such as sodium silicate of the type mentioned above, and
(3) A salt of aluminum.

The aluminum salt may be aluminum chloride, aluminum nitrate, aluminum bromide, aluminum sulphate, and like water soluble aluminum salts of acids, or the salt may be an aluminate such as sodium aluminate or like alkali metal aluminate.

Where the aluminum salt of an acid is used, enough sodium silicate must be provided to react therewith. Thus, an aqueous mixture of water soluble aluminum salt, such as aluminum chloride, and a water soluble alkaline earth metal salt, such as calcium chloride, may be mixed with an alkali metal silicate solution while avoiding establishing more than 10 to 20 percent excess of sodium silicate in the mixture. Preferably, an excess of the chloride solution is used.

The following is illustrative:

EXAMPLE VI

A solution containing 100 grams per liter of calcium chloride and 6.6 grams per liter of $AlCl_3$ was mixed with a solution of the sodium silicate $Na_2O(SiO_2)_{3.3}$ of a concentration equivalent to 100 grams per liter of $SiO_2$ in a centrifugal pump according to the method described above. The chloride solution was in stoichiometric excess. The resulting product on filtering and drying had a surface area of 94 square meters per gram and contained 15.76 percent CaO, 65.49 percent $SiO_2$, and 2.4 percent $Al_2O_3$. This product dispersed better in rubber than did calcium silicate prepared without aluminum.

Other alumina-silica products which may be used according to this invention are those which are prepared by precipitation of silica from sodium silicate in a pigmentary form having a particle size in the desired range, followed by reaction of the product with an aluminum salt, for example, aluminum sulphate. Thus, the silica which is precipitated and stabilized according to the process described in an application of Fred S. Thornhill, Serial No. 308,249, filed September 6, 1952, may be subjected to treatment with aluminum chloride or aluminum sulphate in order to deposit on the silica a small quantity of alumina. The composition of these products depends, of course, upon the amount of aluminum sulphate or aluminum chloride which is used. That is, the more aluminum sulphate used within limits, the more alumina is deposited on the silica. Of course, the limit of alumina which can be picked up by silica of this character depends to a very large degree upon the adsorptive character of the silica. However, concentrations of alumina ranging up to about 4 or 5 percent by weight, based upon the weight of the total solids thus obtained, can be produced. The following is a typical example:

EXAMPLE VII

Seventeen thousand gallons of a sodium silicate solution is placed in a 50,000-gallon tank. This solution contains the sodium silicate $Na_2O(SiO_2)_{3.3}$ in amount sufficient to establish an $Na_2O$ concentration of 20.3 grams per liter. This solution contains no sodium chloride except that minor amount (less than 0.08 percent) usually present in commercial sodium silicate. The solution is held at a temperature of 167° F.±5°. Carbon dioxide gas containing 10 to 10.3 percent of $CO_2$, the balance being nitrogen and air, is introduced into the solution at a gas temperature of 115 to 145° F. at a rate sufficient to introduce into the solution 1250 cubic feet of the carbon dioxide gas per minute, measured at 760 millimeters pressure and 0° C. This gas is introduced directly under a turbo agitator in a manner to achieve uniform agitation of the gas. The mixture is vigorously agitated. The carbon dioxide introduction is continued at this rate for 8½ hours, at which time about 120 to 140 percent of the theoretical amount of $CO_2$ has been adsorbed. After this period of 8½ hours, the rate of introduction of carbon dioxide is reduced to 400 cubic feet per minute and the solution is boiled for 1½ hours. The slurry is then washed and the silica is recovered. Five thousand gallons of the slurry prepared as above was washed and the pH of the resulting slurry adjusted to 9.8 and the product was filtered.

One-half of the precipitate was repulped in water to form 1144 gallons of slurry. Twenty-four gallons of hydrochloric acid was added to adjust the pH of the product to 5.6. Thereafter, 4 pounds of lime was added to the solution and the pH of the slurry rose to 6.45. The resulting product was filtered and dried.

The remaining half of the silica was repulped in about the same volume of water and 100 pounds of $$Al_2(SO_4)_3 \cdot 18H_2O$$

was added to the resulting slurry whereupon the pH of the solution fell to 6.9. Enough hydrochloric acid was added to reduce the pH to 5.7. Thereafter, lime was added to raise the pH to 7.

The resulting silicas were compounded in a butadiene-acrylonitrile copolymer according to the following recipe:

| | Parts by weight |
|---|---|
| Hycar Or 25 (a butadiene-acrylonitrile copolymer) | 100 |
| Zinc oxide | 5 |
| Siliceous pigment | 58.5 |
| MBTS (benzothiazole disulfide) | 1.5 |
| Methyl Tuads (tetramethylthiuram disulfide) | 0.5 |
| Sulphur | 2.0 |
| Cumarone resin | 12.5 |
| Dibutyl phthalate | 12.5 |
| Stearic acid | 1.5 |
| Agerite | 3 |

The resulting product was vulcanized and subjected to standard tests. The product produced using the silica treated with alum had a tensile strength of about 3500 to 3600 pounds per square inch and a tear of 330 to 350 pounds per inch thickness. In contrast, the tensile strength of the silica in which no alum was present was approximately 3000 pounds per square inch and the tear strength was about 280 to 290 pounds per inch thickness. This test clearly emphasizes the improved strengths which are achieved using aluminum.

Alumina-silica pigment also may be prepared by digesting kaolin with concentrated caustic soda. Typical products having the desired properties have the following analyses:

Table II

| | Sample A | Sample B | Sample C |
|---|---|---|---|
| Loss at 105° C. (percent) | 11 | 4 | 5 |
| Loss on ignition (percent) | 18 | 16 | 9 |
| Surface area, (m.²/g.) | 188 | 76 | 129 |
| pH | 6.6 | 10.8 | 10.8 |
| Blue light reflectance (percent) | 95 | 97 | 96 |
| $SiO_2$ (percent) | 60.2 | 49.2 | 63.6 |
| $R_2O_3$ (percent) | 13.0 | 10.4 | 12.0 |
| $Fe_2O_3$ (percent) | 0.24 | 0.21 | 0.34 |
| $Na_2O$ (percent) | 6.9 | 9.1 | 9.4 |
| CaO (percent) | <0.1 | 11.8 | 0.4 |
| MgO (percent) | <0.1 | 0.2 | 0.3 |

As has been previously stated, the above described alumina-silica pigments may be incorporated in rubber in any convenient way and the rubber vulcanized. A typical formulation which is very good for acrylonitrile-butadiene copolymers is that described in Example VII. The following are others:

A

| | Parts by weight |
|---|---|
| GR–S | 100.0 |
| ZnO | 5.0 |
| Sulphur | 3.0 |
| Phenyl beta naphthylamine | 1.0 |
| Altax (dibenzothiazyl disulfide) | 1.2 |
| Methyl Tuads (tetramethylthiuram disulfide) | 0.15 |
| Cumarone resin | 15.0 |
| Diethylene glycol | 3.5 |
| Alumina-silica pigment | 58.5 |

B

| | |
|---|---|
| Butyl rubber—GR–I–15 | 100.0 |
| Alumina-silica pigment | 39.0 |
| Zinc oxide | 5.0 |
| Tellurac (tellurium diethyl dithiocarbamate) | 1.0 |
| Zenite (90% zinc salt of 2-mercaptobenzothiazole-10% hydrocarbon wax) | 1.0 |
| Sulphur | 2.0 |
| Diethylene glycol | 2.5 |
| Diethylene glycol bis (butoxyethyl carbonate) | 1.0 |

Although the present invention has been described with reference to the specific details of certain embodiments thereof, it is not intended that such details shall be regarded as limitations upon the scope of the invention except insofar as incorporated in the accompanying claims.

This application is a continuation-in-part of the following: Serial No. 770,169, filed August 22, 1947, Serial No. 63,205, filed December 2, 1948 (now abandoned), Serial No. 277,760, filed March 21, 1952, and Serial No. 283,721, filed April 22, 1952.

What is claimed is:

1. A vulcanizate of a synthetic rubberlike copolymer of butadiene and acrylonitrile and an amorphous alumina-silica pigment containing 6 to 300 moles of $SiO_2$ per mole of $Al_2O_3$, the ratio of $SiO_2$ to metal oxide being in excess of 3 and the ratio of moles of $Al_2O_3$ per mole of other metal oxides being not less than 0.2, said pigment having an average ultimate particle size of 0.01 to 0.05 micron.

2. A vulcanizate of vulcanizable rubbery material of the group consisting of natural rubber, polymers of diolefins and copolymers of diolefins and ethylenically unsaturated compounds and an amorphous alumina-silica pigment containing at least 6 moles of $SiO_2$ per mole of $Al_2O_3$, the ratio of $SiO_2$ to metal oxide being in excess of 3 and the ratio of moles of $Al_2O_3$ per mole of other metal oxides being not less than 0.2, said pigment having an average ultimate particle size of 0.01 to 0.05 micron.

3. A vulcanizate of vulcanizable rubbery material of the group consisting of natural rubber, polymers of diolefins and copolymers of diolefins and ethylenically unsaturated compounds and an amorphous alumina-silica pigment containing at least 6 moles of $SiO_2$ per mole of $Al_2O_3$, the ratio of $SiO_2$ to metal oxide being in excess of 3 and the ratio of moles of $Al_2O_3$ per mole of other metal oxides being not less than 0.2, said pigment having an average ultimate particle size of 0.01 to 0.05 micron and a surface area of 60 to 200 square meters per gram.

4. The vulcanizate of claim 3 wherein the bound water of said pigment is in the proportion of one mole per 3 to 30 moles of $SiO_2$ therein.

5. The vulcanizate of claim 4 wherein the pigment contains at least 80 percent by weight of $SiO_2$.

6. A vulcanizate of vulcanizable rubbery material of the group consisting of natural rubber, polymers of diolefins and copolymers of diolefins and ethylenically unsaturated compounds and a finely divided, amorphous metal oxide-silica pigment containing at least 6 moles of $SiO_2$ per mole of $M_2O_3$ where M is a metal of the group consisting of iron and aluminum, the ratio of $SiO_2$ to metal oxide being in excess of 3 and the ratio of moles of $M_2O_3$ per mole of other metal oxides being not less than 0.2, said pigment having an average ultimate particle size of 0.01 to 0.05 micron.

7. The vulcanizate of claim 6 wherein the pigment contains at least 80 percent by weight of $SiO_2$.

8. The vulcanizate of claim 6 wherein the metal M is iron.

References Cited in the file of this patent

UNITED STATES PATENTS

| | | |
|---|---|---|
| 2,389,352 | Fisher | Nov. 20, 1945 |
| 2,413,134 | Barrer | Dec. 24, 1946 |
| 2,560,043 | Schmidt | July 10, 1951 |
| 2,689,841 | Augustin | Sept. 21, 1954 |
| 2,692,869 | Pechukas | Oct. 26, 1954 |
| 2,692,870 | Pechukas | Oct. 26, 1954 |

FOREIGN PATENTS

| | | |
|---|---|---|
| 156,807 | Australia | Mar. 20, 1952 |